United States Patent [19]

MacCracken et al.

[11] Patent Number: 5,598,720
[45] Date of Patent: Feb. 4, 1997

[54] AIR BUBBLE HEAT TRANSFER ENHANCEMENT SYSTEM COOLNESS STORAGE APPARATUS

[75] Inventors: Mark M. MacCracken, Englewood, N.J.; Brian M. Silvetti, Tompkins Cove, N.Y.; Jose R. Bonet, North Bergen, N.J.

[73] Assignee: Calmac Manufacturing Corporation, Englewood, N.J.

[21] Appl. No.: 510,204

[22] Filed: Aug. 2, 1995

[51] Int. Cl.$^6$ .................................................. F25D 17/02
[52] U.S. Cl. .................. 62/434; 62/59; 165/10; 165/104.17
[58] Field of Search .................. 165/10 A, 104.17; 62/434, 430, 59

[56] References Cited

U.S. PATENT DOCUMENTS

| | | | |
|---|---|---|---|
| 3,998,071 | 12/1976 | Barthel | 62/430 |
| 4,096,709 | 6/1978 | Barthel | 62/59 X |
| 4,757,690 | 7/1988 | Holowczenko et al. | 62/59 |

*Primary Examiner*—Christopher B. Kilner
*Attorney, Agent, or Firm*—Bond, Schoeneck & King, LLP

[57] ABSTRACT

In coolness storage apparatus wherein brine in heat exchange tubes freezes and melts water and air is bubbled up through the water during the melting cycle to enhance heat exchange efficiency by gently circulating the water, vertical heat transfer strips in thermal conducting contact with the tubes for accelerating melting along each strip early in the discharge cycle to open channels through which the air bubbles stream to the top zone of the tank.

15 Claims, 3 Drawing Sheets

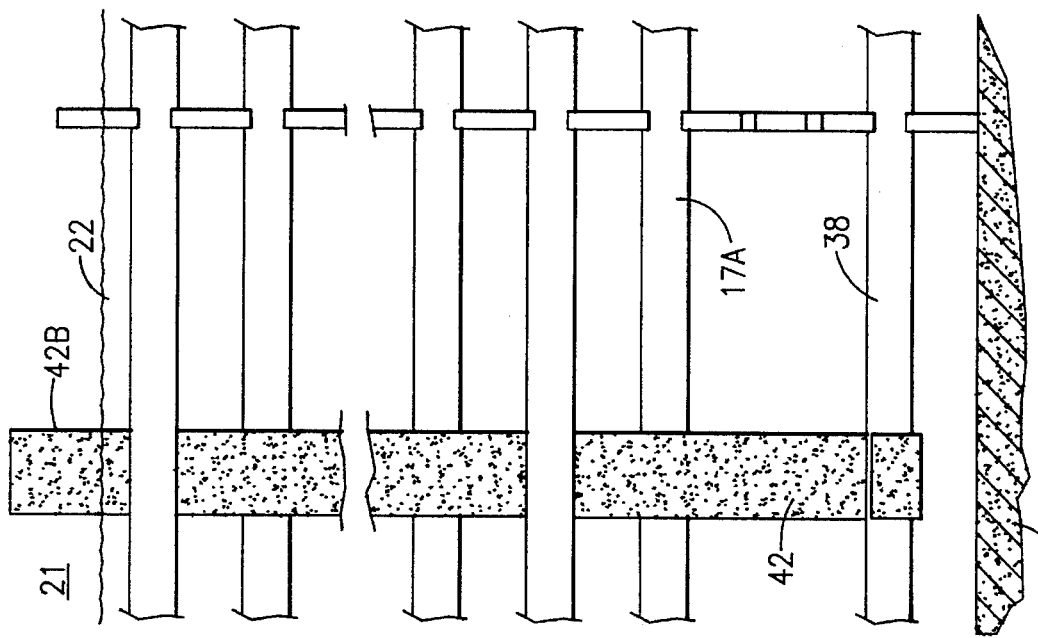
FIG.4
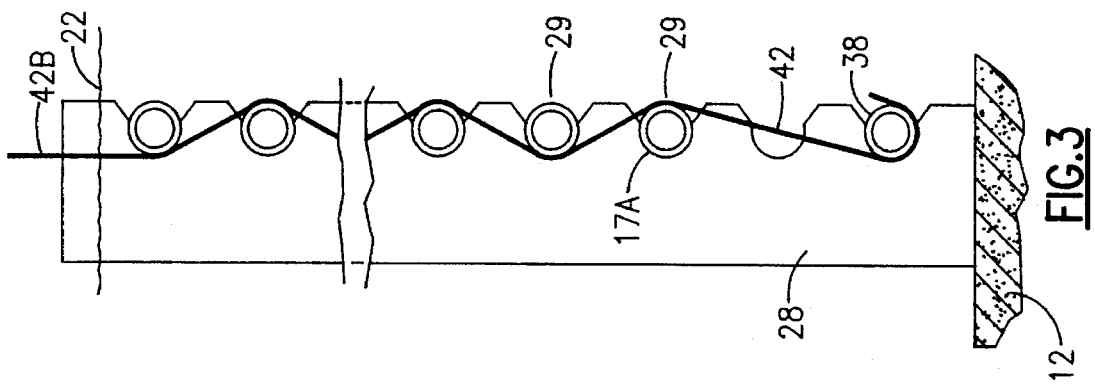
FIG.3
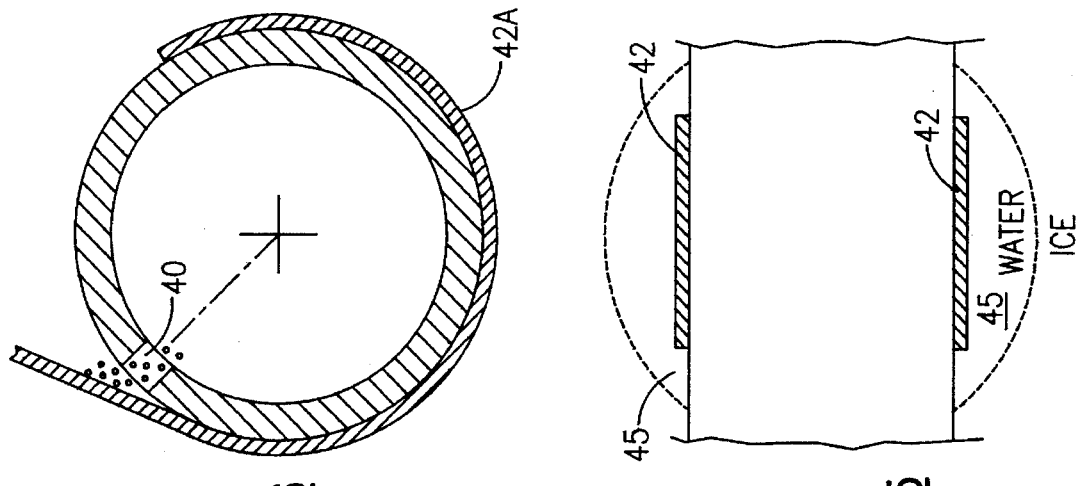
FIG.6
FIG.5

AIR BUBBLE HEAT TRANSFER ENHANCEMENT SYSTEM COOLNESS STORAGE APPARATUS

BACKGROUND OF THE INVENTION

Certain high performance coolness storage systems include a covered cylindrical tank with heat exchange tube spirals spaced one over the other and connected to inlet and outlet headers so that a phase-change material (PCM) in the tank may be alternately frozen and thawed by brine circulating through tubes immersed in the PCM. Such systems have been sold commercially for many years by Calmac Manufacturing Corporation of Englewood, N.J., U.S.A., under the trademarks LEVLOAD and ICE BANK and are described in U.S. Pat. Nos. 4,671,347, 4,954,278 and 5,054,298.

In a preferred form of these coolness storage devices the circulation of the brine through the heat exchange tubes is in a counterflow or opposite direction from one tube spiral to the next. This is achieved by having a first brine inlet header in a central zone of the tank free of the tubes connected through every other tube spiral to a first outlet header in an outer tank zone surrounding the bundle of tube spirals, and a second inlet header alongside the first outlet header in the outer zone connected through the alternate tube spirals to a second brine outlet header alongside the first inlet header in the central tank zone.

In the operation of these high performance coolness storage systems the PCM is alternately melted during a discharge cycle and frozen during a charging cycle. During the charging cycle ice builds up around each heat exchange tube spiral starting from the end adjacent the inlet header and progressing to the end adjacent the outlet header. With the counterflow arrangement of brine circulation in alternate heat exchange tube spirals, this results in progressively totally freezing the PCM at a uniform rate in all regions of the PCM in the tank affected by the tubes. A substantially solid block of ice is thereby formed around he tubes. During the discharge cycle the ice is melted from around the tubes in the same progressive fashion.

In other differing designs of coolness storage apparatus in the prior art, heat transfer efficiency is known to be enhanced by introducing air bubbles into liquid PCM in the bottom of the tank so that streams of bubbles rising upwardly gently circulate the PCM as it melts. These differing forms of coolness storage devices typically consist of rectangular tanks in which a zone of PCM in the bottom of the tank never freezes, and it is there in that always-liquid bottom zone that the air bubbles originate through perforated tubes connected to a source of pressurized air.

Application of air bubble systems to known spiral tube counterflow heat exchangers has not heretofore been notably successful. As a discharge cycle commences and ice begins to melt uniformly throughout that zone of the tank affected by the spiral tubes, there is a prolonged period when uninterrupted horizontal layers of ice are still present across the tank, including a continuous layer beneath the lowermost tube spiral above the always-liquid bottom zone where the air bubbler tube sends streams of bubbles upwardly. The increasing amount of water forming throughout the tank during that period cannot be reached and circulated by the air bubble stream because of the barriers presented by continuous ice layers. The air bubbles ineffectually stream upwardly through the always-liquid central or outer zones of the tank with no heat transfer efficiency enhancement on the growing volumes of water still enclosed within the melting ice. Not until the continuous horizontal ice layers begin to melt and perforate, which occurs substantially simultaneously throughout the tank in a properly designed counterflow system, do the air bubble streams begin circulating the water in the operative regions of the tank affected by the spiral heat exchange tubes.

SUMMARY OF THE INVENTION

The air bubble heat transfer enhancement system of the invention is applicable to coolness storage apparatus wherein heat exchange tubes are arranged in a tank and wherein inlet and outlet headers are connected to the tubes so that brine flows in the tubes to freeze substantially solid and melt a mass of PCM around the tubes during cycles of coolness charging and discharging respectively. The system includes pressurized air supply conduit means in the tank. Air bubbler means is connected to the air supply conduit means and is located beneath the heat exchange tubes. Aperture means are located in the air bubbler means from which bubbles stream upwardly into the liquid PCM during the discharge cycle and upon introduction of pressurized air into the air bubbler means through the air supply conduit means. Heat transfer elements extend upwardly from adjacent the air bubbler means in thermal conductive contact with the heat exchange tubes for accelerating PCM melting early in the discharge cycle to open channels through which the air bubbles can stream upwardly through the melted PCM.

The tubes may be arranged in the tank in substantially planar spirals spaced one over the other. First and second pairs of inlet and outlet headers may be connected to inner and outer ends of every spiral so that brine flows in opposite directions in adjacent spirals to progressively freeze and melt the PCM substantially uniformly.

The aperture means may be a series of spaced holes.

The heat transfer elements are preferably metal strips, specifically of aluminum, extending from above each respective air bubbler hole in thermal conductive contact with the heat exchange tubes. Preferably the strips project above the surface of the PCM in the tank top zone. The strips may be woven inwardly and outwardly around the tubes for increased thermal conductive contact therewith. The lowermost end of each strip may be wrapped partially around and secured to the air bubbler tube alongside its associated hole. Each air bubbler tube hole may be angled slightly off vertical to direct its bubble stream against an adjacent face of the associated heat transfer strip.

Check valve means may be associated with the air supply conduit means to prevent back flow of liquid above the bottom zone of the tank where it could freeze during the charging cycle. The air supply conduit means may comprise first and second air supply conduits extending downwardly from the top zone of the tank from outer and central zones respectively of the tank. The air bubble tube may be connected at its inner and outer ends to the first and second air supply conduits respectively, and the check valve means may comprise individual check valves located in each of the first and second air supply conduits in the bottom zone tank.

BRIEF DESCRIPTION OF THE DRAWINGS

FIG. 3 is an enlarged fragmentary side elevation of one of a number of spacer strips holding the heat transfer tubes and the air bubbler tube in their operating positions within the tank;

FIG. 4 is a fragmentary elevation directed to the face of one of the heat transfer strips and the edge of one of the associated spacer strips with the various tubes shown in place;

FIG. 5 is an enlarged fragmentary view showing one of the strips in section wrapped around one of the heat exchange tubes in thermal conductive engagement therewith; and FIG. 6 is an enlarged lateral cross section taken through the air bubbler tube showing one of the holes therein and the strip associated with that hole wrapped partially around the air bubbler tube.

DESCRIPTION OF PREFERRED EMBODIMENT

Figure 1:
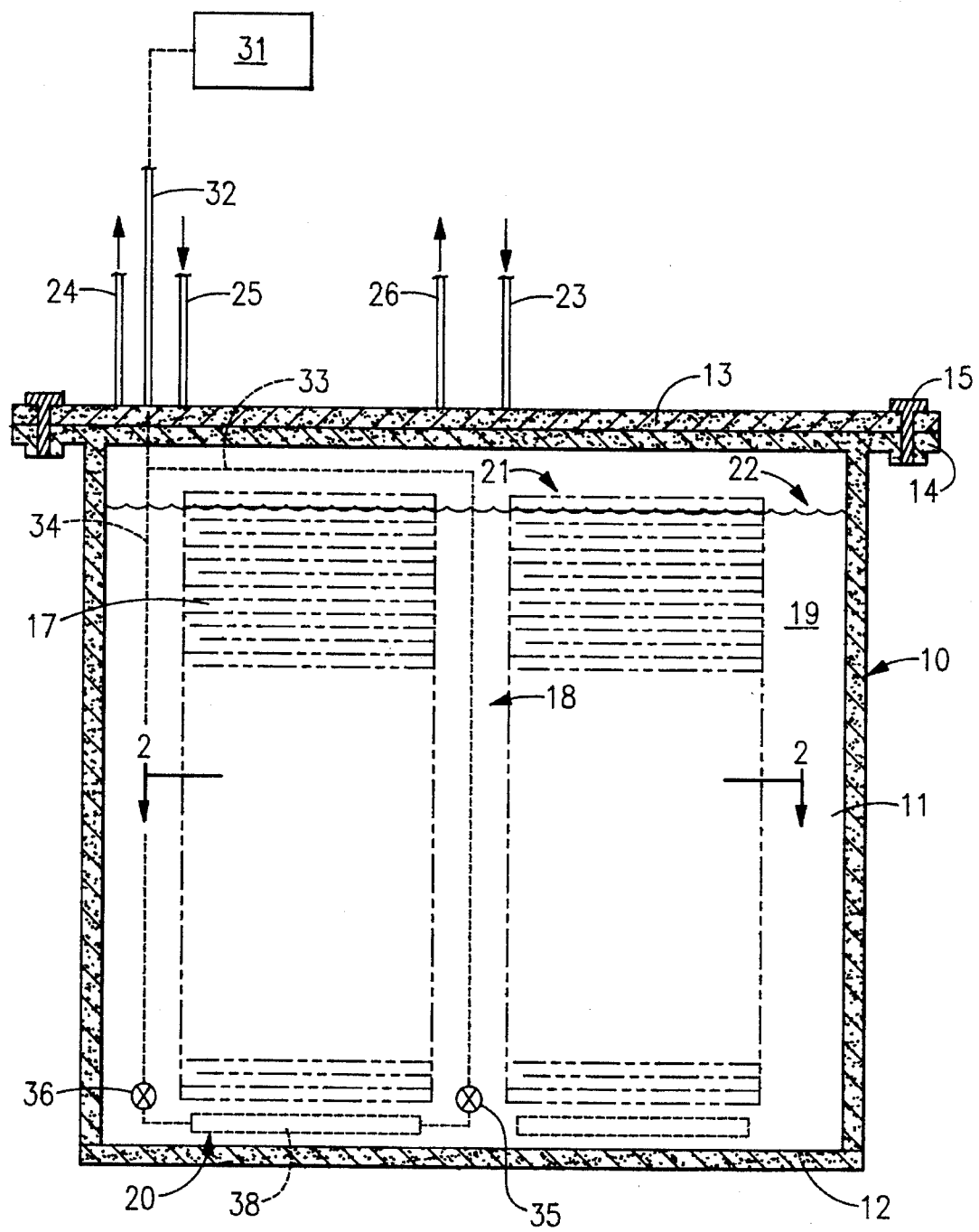
FIG. 1 is an elevation partly in section and partly in schematic form of coolness storage apparatus in which the air bubble heat transfer enhancement system of the invention is employed.

Referring first to FIG. 1 the coolness storage apparatus of the invention includes a tank 10 having a cylindrical wall 11 of composite thermally insulated construction. An insulated base 12 defines the bottom of the tank 10. A circular cover 13, preferably with a foam insulation core, is disposed over the top of the tank 10 and its periphery may be secured to a flange 14 around the upper edge of the tank 10 by a circle of bolts 15. A typical tank 10 may be approximately eight feet high and over seven feet in diameter. Coiled within it are extended lengths of plastic heat exchange tubes 17 in a series of flat spirals forming a vertically extended bundle of tubes. A central zone 18 within the tank 10 is free of the heat exchange tubes 17 and so too is an outer zone 19 around the heat exchange tubes 17 and inside the wall 11 of the tank 10.

There may be as many as fifty to sixty individual heat exchange tube spirals arranged in the tank from a bottom zone 20 thereof up to a level closely below the flange 14 in a top zone 21 of the tank. In use the tank contains a PCM such as water up to a level indicated by the reference numeral 22 in the top zone 21 and therefore submerging all of the heat exchange tubes 17.

Circulated through the heat exchange tubes 17 is a brine such as ethylene glycol. During charging of the coolness storage apparatus the brine freezes the PCM and during the discharging cycle the brine melts the PCM. A first brine inlet header 23 extends down the central zone 18 of the tank 10 and returns the brine through a first outlet header 24 in the outer zone 19 of the tank. A second brine inlet header 25 is disposed in the outer zone 19 of the tank alongside the first outlet header 24 with a second outlet header 26 in the central zone 18 of the tank 10 alongside the first inlet header 23.

Figure 2:
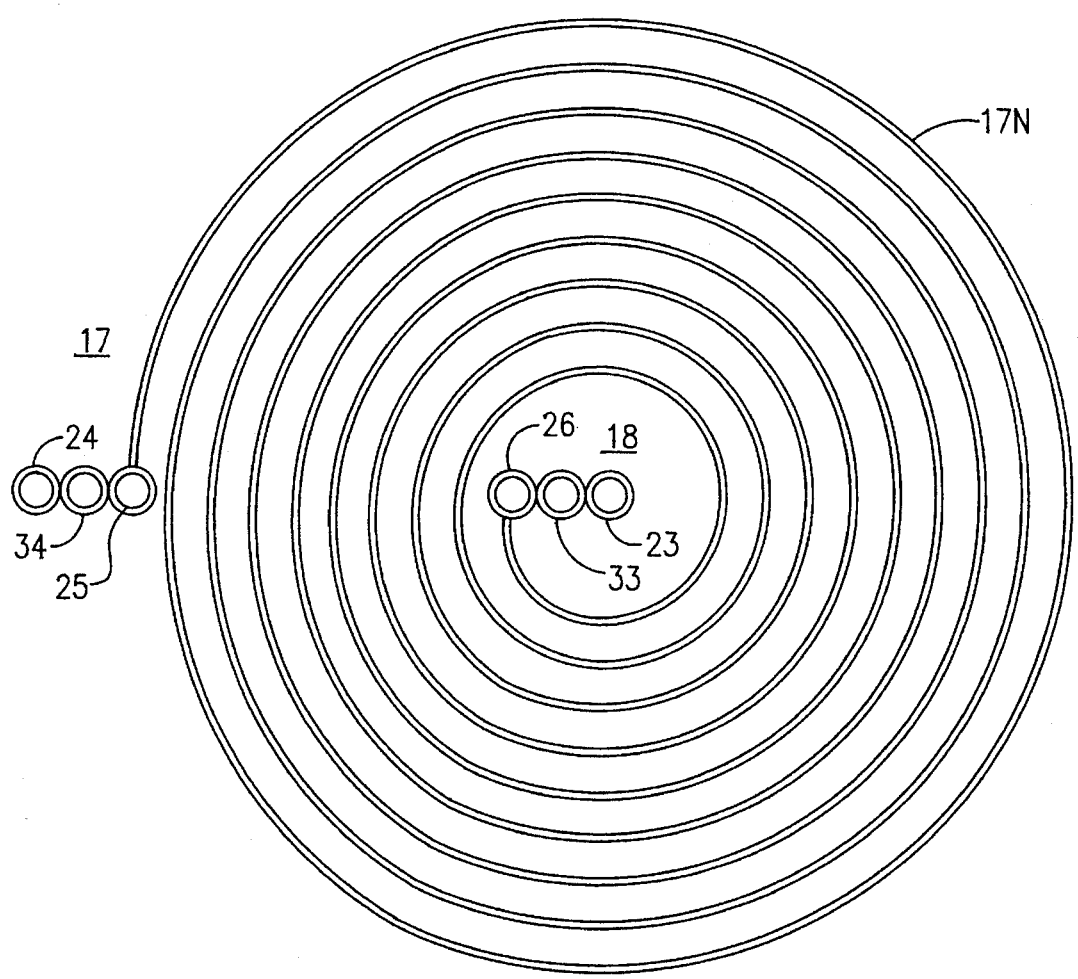
FIG. 2 is a horizontal section taken along the line 2—2 of FIG. 1 showing one representative heat exchange spiral and the associated inlet and outlet header and air conduits.

One of the individual heat exchange tubes designated generally by the reference numeral 17 in FIG. 1 appears in FIG. 2. The characteristic flat spiral configuration seen in FIG. 2 is the same in all of the heat exchange tubes 17 in this preferred embodiment. In practice the number of turns in each tube spiral may vary typically from about fifteen to about thirty, and the number shown in FIG. 2 is for illustration purposes only. The spacing between the turns is generally uniform. The outer end of the tube 17N is connected to the second inlet header 25 and its inner end is connected to the second outlet header 26. The first inlet header 23 in the central zone 18 of the tube bundle and the first outlet header 24 in the outer zone 19 are not connected to this particular heat exchange tube 17N, but instead are connected to the heat exchange tubes immediately above and below.

The means for locating the spirals of heat exchange tubes within the tank and connecting them to their associated inlet and outlet headers is fully described in the aforementioned U.S. Pat. No. 4,671,340 and need not be repeated here. That patent describes spacer strips, one of which is designated 28 in FIGS. 3 and 4 herein, which hold the spirals in notches 29 in a snap-in fashion in proper position in relation to the turns alongside, above and below. That patent also described how the first pair of inlet and outlet headers 23 and 24 and the second pair of inlet and outlet headers 25 and 26 are connected alternately to the inner and outer ends and the outer and inner ends respectively of every other spiral. As a consequence brine flows in opposite directions axially within adjacent spiral tubes to freeze and melt a mass of PCM progressively around the spirals in a substantially uniform manner during cycles of coolness charging and discharging respectively.

An alternative design for achieving that counterflow effect is to connect the spiral tubes to the headers so that the brine flows in the same direction axially in all of the tubes but reverse the direction of the spirals from layer to layer so that the brine counterflows radially in and out from one layer to the next, i.e. alternately clockwise in and clockwise out.

The air bubble heat transfer enhancement system of the invention will now be described with reference to each of FIGS. 1 to 6.

A regenerative blower 31 is provided which is capable of supplying approximately 5 cubic feet per minute of air at about 5 psi, though these figures will vary depending upon the size of the coolness storage apparatus. The output of this source of pressurized air is carried through a main air inlet conduit 32 through the cover 13 and down into the top zone 21 of the tank. Here it branches into first and second air supply conduits 33 and 34. The first air supply 33 extends vertically downwardly to the bottom zone 20 of the tank in the central zone 18, while the second air supply conduit 34 extends downwardly to the bottom zone of the tank 20 through the outer zone 19. Check valves 35 and 36 are located in the conduits 33 and 34 respectively in the bottom zone 20 where the PCM always remains liquid.

An air bubbler tube 38 is provided in the bottom zone 20 of the tank and it is formed in a spiral substantially similar to that of the heat exchange tubes 17. It is snapped into the lowermost notch 29 of the strip(s) 28 as shown in FIG. 3. The next notch above the air bubbler tube 38 in the strip(s) 28 is left vacant and therefore the lowermost heat exchange tube designated 17A in FIGS. 3 and 4 is spaced well above the air bubbler tube 38. This insures that the freezing effect of the lowermost heat exchange tube 17A does not cause freezing of the PCM in the tank bottom zone 20. The air bubbler tube 38 is connected at its inner and outer ends to the first and second air supply conduits 33 and 34 respectively.

As shown in FIGS. 3 and 6, a series of spaced holes 40 are formed along the length of the air bubbler tube 38 perhaps about every 15 inches apart. Typically the holes 40 should be of a diameter of 0.0625 inch (for clarity that diameter is shown somewhat exaggerated in FIG. 6). As shown particularly in FIG. 6 each air bubbler tube hole 40 is angled slightly off vertical for reasons explained below.

When pressurized air is not introduced into the air bubbler tube 38 PCM will back flow somewhat into the air bubbler tube but in no event beyond the check valves 35 and 36 in the first and second air supply lines 33 and 34. Thus the PCM will not rise alongside the bundle of heat exchange tubes 17 where there might be a risk of the PCM freezing in the first and second air supply conduits 33 and 34. As a further safeguard those conduits 33 and 34 may be thermally insulated throughout their lengths to the top zone of the tank and in that case the check valves 35 and 36 could be located in the tank top zone 21.

The linear heat transfer elements of the invention are a multiplicity of aluminum strips 42, one of which appears in FIGS. 3 and 4. Each of the aluminum heat transfer strips 42 may be approximately 0.030 inch in thickness and 0.625 inch in width. Their length will vary depending upon the size of the coolness storage apparatus but typically they may be approximately seven feet long. The aluminum strip(s) 42 are sufficiently stiff to permit them to be wrapped partially around the air bubbler tube at their end portions 42A as shown in FIG. 6 and hold that position to secure themselves to the air bubbler tubes 38. The center line of each of the strips 42 is substantially coplanar with the axis of one associated hole 40 so that the bubble stream from the hole 40 is directed against an adjacent face of the associated strip 42. This insures that the bubbles rise upwardly immediately alongside the associated strips 42 as shown by the dots in FIG. 4.

Each of the heat transfer strips 42 is woven inwardly and outwardly around the successive tubes 17 as shown in FIGS. 3 and 4 to achieve substantial surface-to-surface contact between one face of the strip 42 and a curved portion of each tube 17. This enhances heat transfer between them. A top end portion 42B of each of the strips 42 extends about 3 inches above the surface 22 of the PCM in the top zone 21 of the tank, as seen in FIGS. 3 and 4.

At the commencement of the discharge cycle pressurized air is introduced from the blower 31 downwardly past the check valves 35 and 36 into the opposite inner and outer ends of the air bubbler tube 38. As a consequence any entrained liquid PCM downstream of the check valves 35 and 36 is effectively blown out of the air bubbler tube 38. At the very beginning of the discharge process the tubes 17 are substantially entirely encased within solid ice and therefore the streams of bubbles can only escape upwardly through the always-liquid central zone 18 and outer zone 19. As the relatively warm brine begins to melt the ice around each of the tubes 17 progressively from the inlet and outlet ends thereof, that warmth is transmitted to the heat transfer strips 42 at every area of contact between the tubes 17 and the strips 42. Therefore each of the strips 42 quickly melts a vertical channel 45 shown in FIG. 5 of liquid PCM from the bottom zone 20 to the top zone 21 of the tank. This allows the air bubbles from the respective holes 40 to stream upwardly very early in the discharge process to begin their function of gently circulating the liquid PCM and thereby enhancing heat transfer between the PCM in the tank and the brine in the tubes 17.

Each of the strips 42 extends at its top end portion 42B above the PCM surface 22 because a mound of ice would otherwise form over the top of each strip if they were cut flush with the topmost tube 17. Such a mound of ice would essentially seal the upper end of each of the channels 45 for a certain period of time during the beginning of the discharging cycle and that is to be avoided. Also to be avoided, of course, is any introduction of pressurized air into the air bubbler tube 38 during the charging cycle.

The heat transfer strips 42 not only provide the channels 45 for enhancing circulation during the discharging cycle but they also accelerate the time required for freezing and melting during the charging and discharging cycles. The reason for this is that the PCM mass experiences a heat transfer effect not only from the many horizontal heat exchange tubes 17 but also from the multiplicity of vertical heat transfer strips 42 which may be as many as two hundred in number (equal to the number of holes 40).

Modifications to this preferred embodiment will be self-evident. For example, pressurized air may be introduced into the air bubbler tube 38 not only from its opposite ends by the first and second air supply conduits 33 and 34 but also by a third air supply conduit to the center of the air bubbler tube 38. This would insure that bubble streams would begin to emerge from all of the holes 40 substantially simultaneously. With only the first and second air supply conduits 33 and 34 there may be a short period at the beginning of the discharging cycle when the channels 45 are not yet opened in an annular central region between the inlet and outlet ends of the heat exchanger tubes 17.

The scope of the invention is to be determined by the following claims rather than the foregoing description of the preferred embodiment.

We claim:

1. In coolness storage apparatus wherein heat exchange tubes are arranged in a tank and wherein inlet and outlet headers are connected to the tubes so that brine flows in the tubes to freeze substantially solid and melt a mass of PCM around the tubes during cycles of coolness charging and discharging respectively, an air bubble heat transfer enhancement system comprising a) pressurized air supply conduit means in said tank, b) air bubbler means connected to the air supply conduit means and located beneath the heat exchange tubes, c) aperture means in the air bubbler means from which bubbles stream upwardly into the liquid PCM during the discharge cycle and upon introduction of pressurized air into the air bubbler means through the air supply conduit means, and d) heat transfer elements extending upwardly from adjacent the air bubbler means in thermal conductive contact with the heat exchange tubes for accelerating PCM melting early in the discharge cycle to open channels through which the air bubbles can stream upwardly through the melted PCM.

2. An air bubble heat transfer system according to claim 1 wherein the tubes are arranged in substantially planar spirals spaced one over the other.

3. An air bubble heat transfer system according to claim 2 wherein first and second inlet and outlet headers are connected to inner and outer ends of every spiral so that brine flows in opposite directions in adjacent spirals to freeze and melt the PCM around the spirals substantially uniformly.

4. An air bubble heat transfer system according to claim 1 wherein the aperture means comprises a series of spaced holes.

5. An air bubble heat transfer system according to claim 4 wherein the linear heat transfer elements are metal strips extending from above each respective air bubbler hole in thermal conductive contact with the heat exchange tubes.

6. An air bubble heat transfer system according to claim 5 wherein the strips project above the PCM surface at the tank top zone.

7. An air bubble heat transfer system according to claim 5 wherein the strips are of aluminum.

8. An air bubble heat transfer system according to claim 5 wherein the strips are woven inwardly and outwardly around the tubes for increased thermal conductive contact therewith.

9. An air bubble heat transfer system according to claim 5 wherein the air bubbler means comprises a tube and wherein the lowermost end of each strip is wrapped partially around and secured to the air bubbler tube alongside its associated hole.

10. An air bubble heat transfer system according to claim 9 wherein each air bubbler tube hole is angled slightly off vertical to direct its bubble stream against an adjacent face of the associated heat transfer strip.

11. An air bubble heat transfer enhancement system according to claim 1 wherein the air conduit means extends from a top zone of the tank to a bottom zone of the tank where the PCM does not freeze during the charging cycle and which includes check valve means associated with said air supply conduit means to prevent back flow of liquid PCM above the bottom zone of the tank where it could freeze during the charging cycle.

12. An air bubble heat transfer enhancement system according to claim 1 wherein the air supply conduit means comprises first and second air supply conduits extending downwardly from a top zone of the tank through outer and central zones respectively of the tank.

13. An air bubble heat transfer enhancement system according to claim 12 wherein the air bubbler means is a tube connected at its inner and outer ends to the first and second air supply conduits respectively.

14. An air bubble heat transfer enhancement system according to claim 13 wherein individual check valves are located in each of the first and second air supply conduits in the bottom zone of the tank to prevent back flow of liquid PCM above the bottom zone of the tank where it could freeze during the charging cycle.

15. In coolness storage apparatus wherein heat exchange tubes are arranged in a tank in substantially planar spirals spaced one over the other and wherein first and second pairs of inlet and outlet headers are connected alternately to inner and outer ends and outer and inner ends respectively of every other spiral and brine flows in opposite directions in adjacent spirals to progressively freeze and melt a mass of PCM substantially uniformly around the spirals during cycles of coolness charging and discharging respectively, an air bubble heat transfer enhancement system comprising a) first and second air supply conduits extending from a top zone of said tank through outer and central zones respectively of the tank to a bottom zone of said tank wherein the PCM does not freeze during the charging cycle, b) an air bubbler tube in a spiral substantially similar to that of the heat exchange tubes connected at its inner and outer ends to the first and second air supply conduits respectively and located in said bottom zone of said tank, c) a series of spaced holes along the length of the air bubbler tube to direct streams of bubbles upwardly into the liquid PCM during the discharge cycle and upon introduction of pressurized air into the air bubbler tube through the air supply conduits, and d) aluminum heat transfer strips extending upwardly from above each respective air bubbler hole and projecting above the PCM surface at the tank top zone and woven inwardly and outwardly around the successive tube spirals in thermal conductive contact with every tube spiral for accelerating PCM melting along each strip early in the discharge cycle to open channels through which the air bubbles can stream upwardly to the tank top zone, e) check valves located in each of the first and second air supply conduits in the bottom zone of the tank to prevent backflow of liquid PCM above the bottom zone where it could freeze during the charging cycle, f) the lowermost end of each strip being wrapped partially around and secured to the air bubbler tube alongside its associated hole and each air bubbler tube hole being angled slightly off vertical to direct its bubble stream against one face of the associated heat transfer strip, g) each of said holes being angled slightly off vertical to direct its bubble stream against an adjacent face of the associated heat transfer strip.

* * * * *